(12) United States Patent
Dohrmann et al.

(10) Patent No.: US 6,967,575 B1
(45) Date of Patent: Nov. 22, 2005

(54) METHODS AND APPARATUS FOR UNATTENDED PICKUPS AND DELIVERIES

(75) Inventors: Steve H. Dohrmann, Hillsboro, OR (US); Darren H. Yee, Portland, OR (US); Peter A. Nee, Beaverton, OR (US); James E. Dishman, Portland, OR (US); Seshadri Sathyanarayan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/561,835

(22) Filed: Apr. 28, 2000

(51) Int. Cl.[7] .............................................. G06B 13/14
(52) U.S. Cl. ................. 340/568.1; 340/5.23; 340/5.31; 340/5.6; 340/5.61; 220/592.01; 235/382.5; 705/75; 705/65
(58) Field of Search ............................. 705/17, 18, 23; 340/568.1, 568.2, 569, 825.49, 825.31, 825.34, 340/825.72, 5.2, 5.23, 5.25, 5.3, 5.31, 5.6, 340/5.61, 5.7, 5.65; 220/1.5, 592.01; 232/20, 232/25, 27, 1 R; 235/382, 382.5

(56) References Cited

U.S. PATENT DOCUMENTS

| | | | | |
|---|---|---|---|---|
| 4,727,368 A | * | 2/1988 | Larson et al. | 340/5.6 |
| 5,774,053 A | * | 6/1998 | Porter | 340/568.1 |
| 5,979,750 A | * | 11/1999 | Kindell | 232/19 |
| 6,310,550 B1 | * | 10/2001 | Wagener | 340/546 |
| 6,344,796 B1 | * | 2/2002 | Ogilvie et al. | 340/568.1 |
| 6,404,337 B1 | * | 6/2002 | Van Till et al. | 340/569 |
| 6,415,552 B1 | * | 7/2002 | Khosropour | 52/27 |

FOREIGN PATENT DOCUMENTS

| | | | | | |
|---|---|---|---|---|---|
| JP | 01204618 A | * | 8/1989 | ............ | A47G 29/12 |
| JP | 04087985 A | * | 3/1992 | ............ | B65D 91/00 |
| JP | 04102585 A | * | 4/1992 | ............ | B65D 91/00 |
| JP | 04114891 A | * | 4/1992 | ............ | B65D 91/00 |
| JP | 10117917 A | * | 5/1998 | ............ | A47G 29/12 |
| WO | WO 00/09841 | * | 2/2000 | ............ | E05B 73/00 |

* cited by examiner

Primary Examiner—F. Zeender
(74) Attorney, Agent, or Firm—Schwegman, Lundberg, Woessner & Kluth, P.A.

(57) ABSTRACT

A secure pickup and delivery container includes a lockable door, a control unit, an access element, and an anchoring element, according to one embodiment. The control unit includes a processing element and a memory that can be programmed either on-site or remotely with access privilege information such as identity (e.g. of container, delivery person, etc.), location, date, time, frequency of access, and/or package-specific information. In one embodiment, access privilege information is programmed when an intended recipient of a delivery consummates a point of sale transaction, for example over the Internet or telephone. The access element can be a keypad, a biometric scanner, a card reader, a bar-code reader, and/or a wireless control element to read a programmable token such as a smart card. Delivery personnel can enter access request information into the access element, and if it favorably compares with the access privilege information, the control unit unlocks the door. Notification can be concurrently made via wireline or wireless communications to the intended recipient, who may be situated remote from the secure container. The recipient can optionally return a delivery acknowledgment to the delivery personnel. Details of the delivery transaction can also be recorded electronically on the delivery personnel's token, within the container, or at a remote location.

24 Claims, 4 Drawing Sheets

METHODS AND APPARATUS FOR UNATTENDED PICKUPS AND DELIVERIES

TECHNICAL FIELD

The subject matter relates generally to package transport. More particularly, the subject matter relates to methods and apparatus that enable packages to be picked up or delivered at unattended locations by delivery personnel in a manner that safeguards such packages from theft and adverse environmental conditions.

BACKGROUND INFORMATION

In the field of package transport and delivery, it is well known to use mailboxes located at a postal station or in the vicinity of residences or other buildings occupied by the intended recipients of packages. Generally, mailboxes are suitable for letter-sized packages, but they are not suitable for large packages. Lockable mailboxes that can accommodate large packages and that are accessible by postal delivery personnel are also known, but such mailboxes can only be accessed by postal delivery personnel and the mailbox owner.

With the anticipated rapid growth in Internet commerce, there is projected a corresponding increase in the delivery of packages by delivery personnel. Such packages can be of any type, value, size, weight, and durability. They can include a wide spectrum of items ranging from jewelry, consumer electronics, groceries, cash, pharmaceuticals, large documents, fine art, and so forth.

The preponderance of deliveries need to be made during the working day, which is the peak delivery time for most delivery companies. However, with increasing numbers of people being away from their residence during the day, it is increasingly difficult for delivery personnel to make contact with intended recipients of packages to complete delivery. Consequently, delivery personnel are often compelled to leave packages on a porch or protruding from a mailbox or door, or to attempt to locate a neighbor who is willing to sign for the package; otherwise, delivery personnel must return packages to a distribution center, attempt to make contact with the intended recipient, and deliver the package at a later time. The current process is very inefficient and wastes a significant amount of time and non-renewable vehicular fuel resources. In addition, when packages are not secured at the point of delivery, they are subject to theft, pilferage, spoilage, as well as damage and/or destruction resulting from adverse environmental conditions.

It is often necessary for delivery personnel to pick up packages from residences and other buildings notwithstanding the absence of anyone to safeguard the packages until they can be put into the hands of the delivery personnel.

For the reasons stated above, and for other reasons stated below which will become apparent to those skilled in the art upon reading and understanding the present specification, there is a significant need in the art for methods and apparatus that enable the unattended delivery and pickup of packages in a manner that overcomes the problems mentioned above.

DETAILED DESCRIPTION

In the following detailed description of embodiments of the invention, reference is made to the accompanying drawings which form a part hereof, and in which is shown by way of illustration specific preferred embodiments in which the subject matter may be practiced. These embodiments are described in sufficient detail to enable those skilled in the art to practice them, and it is to be understood that other embodiments ay be utilized logical, mechanical, and electrical changes may be made without departing form the spirit and scope of the subject matter. Such embodiments of the inventive subject matter may be referred to, individually and/or collectively herein by the term "invention" merely for convenience and without intending to voluntarily limit the scope of this application to any single invention or inventive concept if more than one is in fact disclosed. The following detailed description is, therefore, not to be taken in a limiting sense, and the scope of embodiments of the present invention is defined only by the appended claims.

Figure 1:
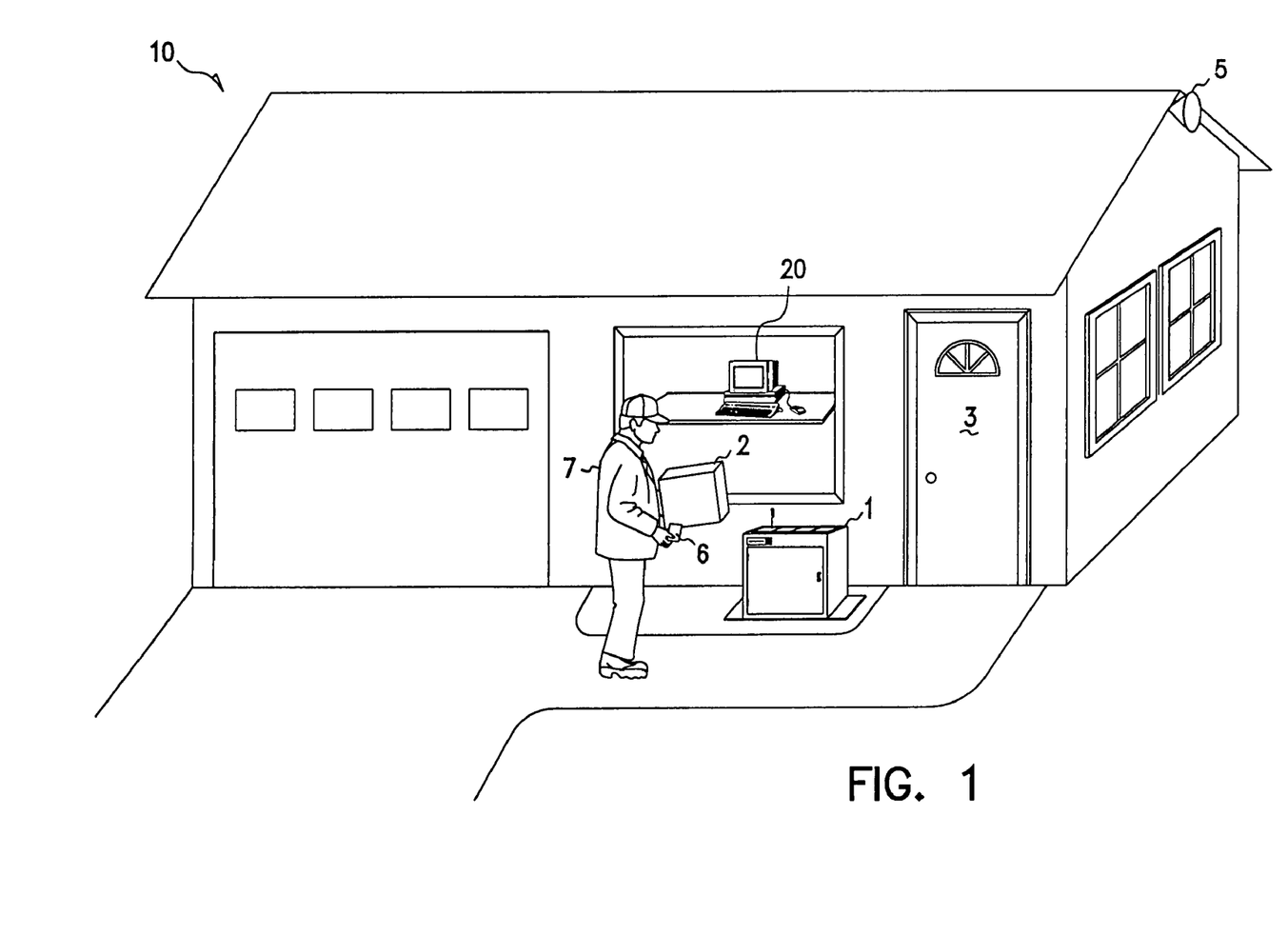
FIG. 1 is a perspective view of a residential building having a secure pickup and delivery container, in accordance with one embodiment of the invention.

FIG. 1 is a perspective view of a residential building 10 having a secure pickup and delivery container 1, in accordance with one embodiment of the invention. Secure container 1 is intended as a secure repository wherein a package 2 can be deposited for later pickup or delivery. A "package" is broadly defined herein as any item that is transported in any manner from one entity (referred to as a "shipper") to another entity (referred to as a "recipient") by means of a transporting entity (referred to as a "delivery person").

A delivery person 7 is shown carrying a package 2 for deposit in secure container 1. Secure container 1 is a self-standing box located near the door 3 of residential building 10, according to one embodiment; however, in other embodiments it can be situated in any suitable location proximate to or within a building that houses one or more intended shippers and/or recipients. For example, secure container 1 could be built into an exterior wall of building 10 or buried partially or entirely underground except for a user-accessible door. In the case wherein secure container 1 is integral with a building, the user-accessible door could be formed as part of an existing door, panel, wall, or other architectural element of the building, so long as it provides the desired degree of physical accessibility to delivery personnel and the requisite protection for packages.

In one embodiment, delivery person 7 carries a token 6 for accessing secure container 1. A "token" is defined herein to include a smart card, credit card, a magnetically encoded card, a personal digital assistant (PDA) or other handheld computing device, a bar-coded card or label, a device capable of communicating via radio frequency or light signals, or any other device that is readily transportable and that can store information. Token 6 need not comprise "active" electronic components, but it can be implemented with "passive" or even purely mechanical components, according to some embodiments. Further details concerning token 6 are provided below.

In one embodiment, building 10 houses a computer 20, such as a personal computer, that is capable of communicating over a network, such as the Internet. According to one embodiment, the network connection is a high speed Internet connection using, for example, a terrestrial or satellite antenna 5; however, any type of network connection could be used, including a digital subscriber line (DSL), cable modem, integrated services digital network (ISDN), telephone modem, wireless modem, network card, or the like.

Computer 20 can be utilized, as described in greater detail below, where it is referred to as one type of "user device", to order items to be delivered to secure container 1. In addition, computer 20 can be utilized, in one embodiment, to define and store access privilege information that sets forth specific limits on physical access to secure container 1. The access privilege information is stored, according to one embodiment, in a control unit (described regarding FIG. 3 below) associated with secure container 1.

In addition, information can be communicated to computer 20 concerning an access of secure container 1 or an attempted access of secure container 1. Such information can include the identity of the delivery person(s), the date and/or time of each access or attempted access, and the identity of each package that has been picked up from and/or delivered to secure container 1.

Figure 2:
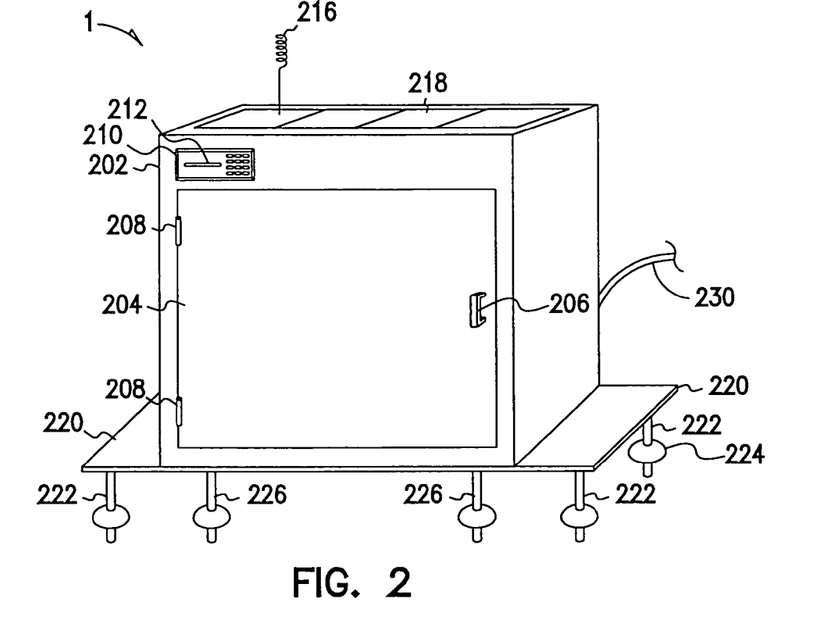
FIG. 2 is a perspective view of a secure pickup and delivery container, in accordance with one embodiment of the invention.

FIG. 2 is a perspective view of a secure pickup and delivery container 202, in accordance with one embodiment of the invention. Secure container 202 includes a lockable door 204 that can include a handle 206. In one embodiment door 204 is coupled to secure container 202 by means of suitable hinges 208. Door 204 allows access to an interior part of the secure container 202. Other types of doors besides hinged doors could be used, such as sliding, shuttered, or revolving doors.

Secure container 202 includes an access element 210 that can be implemented in a variety of ways, such as with a token or card slot 212 or a keypad, as described further below. A delivery person must present access request information to access element 210 that matches stored access privilege information in order to gain physical access to secure container 202.

Secure container 202 can be anchored using any suitable anchoring element that renders secure container 202 substantially immobile. In one embodiment, flanges or panels 220 are provided on secure container 202, and they are anchored to an appropriate structure such as a wall, foundation, concrete slab, or the like, using tamper-resistant fasteners such as anchor bolts 222. Anchor bolts 222 can be of any type and can have a large disc 224 to resist removal. Anchor bolts 226 can be similar to anchor bolts 222, but rather than being inserted through panels 220, they are inserted through apertures in the floor (not shown) on the interior of secure container 202 to thwart attempts to remove the secure container by removal of the bolt heads.

Secure container 202 can include a self-contained power source, such as a solar panel 218 that, in one embodiment, enables secure container 202 to be located anywhere without requiring a connection to an electric power line. An antenna 216 can be provided, according to one embodiment, to support wireless communications to and/or from secure container 202; alternatively, communications with secure container 202 can be supported via a cable or other wireline element 230 that links secure container 202 with a computer network that is accessible by shippers, recipients, and/or delivery personnel.

Figure 3:
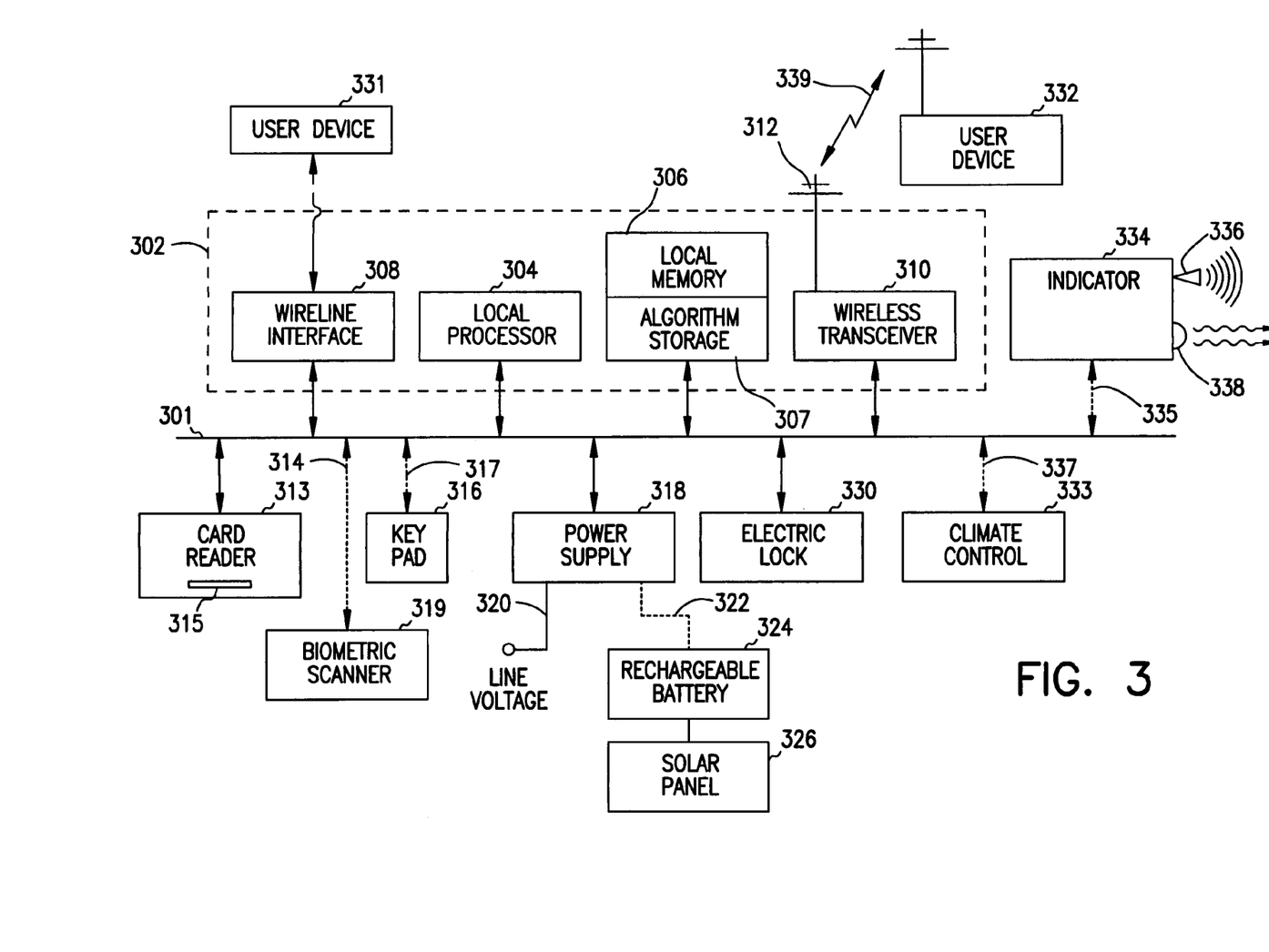
FIG. 3 is a block diagram of electrical components associated with a secure pickup and delivery container, in accordance with one embodiment of the invention.

FIG. 3 is a block diagram of electrical components associated with a secure pickup and delivery container, in accordance with one embodiment of the invention. The electrical components include a system bus 301, a control unit 302, a power supply 318, an electric lock 330, and an access element to receive a request to access the interior of the container. The access element can be of any suitable type, such as a card/token reader 313, keypad 316, and/or a biometric scanner 319. Other types of access elements can be utilized with embodiments of the present invention. The foregoing card/token reader 313, keypad 316, and biometric scanner 319 are merely illustrative. For example, a programmable bar-code reader on the secure pickup and delivery container could read a bar-coded label on a package. Likewise, any of a number of access elements could be employed that comprise a wireless interface element to communicate with a token via a wireless interface, e.g. a radio frequency or light-based interface, when the token takes the form, for example, of a wireless PDA, a one-way or two-way radio, an RF tag device, a laser-based device, an infra-red device, or the like. To provide additional security or for other reasons, more than one access element and/or more than one token could be utilized. The design of suitable access elements to implement the herein-disclosed embodiments of the present invention is well within the abilities of one skilled in the art.

Control unit 302 includes a processing element in the form of local processor 304, and it further includes a memory element in the form of local memory 306. Local processor 304 executes computer program instructions stored in local memory 306, stores data into local memory 306, and reads data from local memory 306.

Local memory 306 can comprise any suitable type or types of memory storage elements, such as random access memory (RAM), read only memory (ROM), hard disk, floppy disk, compact disk (CD), or any other type of memory device or combination of memory devices. Local memory 306 includes a memory area 307 that stores algorithms in the form of computer-executable instructions, data structures, and/or other data types. These algorithms can be utilized by certain embodiments of the present invention to perform various methods of operating a secure pickup and delivery container, illustrative ones of which will be described further below.

Local processor 304 can be of any suitable type. As used herein, "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit. In one embodiment, local processor 304 is an Intel (R) Pentium (R) III processor available from Intel Corporation, Santa Clara, Calif.

Control element 302 can also include a wireline interface 308, to which at least one user device 331 can be coupled, and/or a wireless interface in the form of wireless transceiver 310, with which at least one user device 332 can be in wireless communication via antenna 312 over wireless link 339.

User devices can include computers of all types, including personal computers, hand-held computers, and Web appliances; cellular and wireline telephones; pagers; televisions; radios of all types; video game players; and any other device capable of communication. Depending upon the particular implementation, user devices can communicate information unidirectionally to or from control unit 302 or communicate bidirectionally with control unit 302.

For example, a user device 331 or 332 can communicate access privilege information to be stored in local memory 306 of control unit 302.

The access privilege information can comprise, for example, information regarding a package. Such package-specific information could grant access only for the delivery of a specifically identified package. The identity of the package could be entered by the delivery person at the time of delivery. Alternatively, the package shipping papers or address label could, for example, contain a token that, upon presentation to the secure container's access element, grants physical access to the secure container.

The access privilege information can comprise, for example, information regarding a container, such as the identity of the container.

The access privilege information can comprise, for example, information regarding a delivery person who is authorized to physically access the secure container. The identity information can identify a particular individual or a group of individuals, or it can grant unrestricted access to anyone presenting a token to the secure container's access element.

The access privilege information can comprise information, for example, regarding a token, such as the identity of the token and/or token holder, type of token, and so forth.

The access privilege information can comprise, for example, information regarding location, such as the geographical location of a secure container to which access is desired to be granted. Alternatively, such location information could grant access by delivery personnel to all secure containers located within a specified region and deny access to secure containers outside of the region.

The access privilege information can comprise, for example, information that indicates what manner of notification should be made regarding an attempted access of the container, or regarding a successful access of the container, or regarding an unsuccessful access of the container. Such information includes information specifying who should be notified, when and how notification should be made, whether an acknowledgment of such notification is to be requested from the person notified, and so forth.

The access privilege information can comprise, for example, date and/or time information. Date and/or time information could grant access during a specified range of dates and/or during a specified range of times. For example, access could be granted only during a two-day period and only between the hours of 10 a.m. and 2 p.m.

The access privilege information can comprise, for example, frequency of delivery information. Frequency of delivery information could grant only a specified quantity or number of accesses and deny access after that number had been reached. The frequency of access information could be reset on a daily, weekly, or other periodic basis, or it could be a one-time value that, when attained, renders the token void.

Other types of access privilege information can be communicated to and stored in control unit 302, depending upon the needs of the particular pickup and delivery system the subject matter is utilized in.

Access privilege information can be communicated to control unit 302 at any time and corresponding to any of a variety of transactions. For example, if a recipient places a telephone order for the delivery of perishable goods requiring refrigeration, either the recipient or the shipper could send access privilege information to local memory 306 of control unit 302 specifying the desired access privileges, which could identify the delivery person, the anticipated time range of delivery, and the location of the secure container. In addition, the access privilege information could include information specifying that certain actions shall occur concurrently with or shortly after the moment of delivery. These could include notification to the shipper and/or recipient of the delivery by communication of a message to a user device or the activation of indicator 334 (discussed below). These could further include an order for the control unit 302 to turn on the alternative power supply that comprises rechargeable battery 324 and solar panel 325 (discussed below). They could additionally include an order to turn on the climate control element 333 (discussed below).

In one embodiment, user devices 331 and 332 communicate information to system users, such as shippers and recipients, to notify them of event occurrences. For example, notification can be communicated regarding a delivery to or a pickup from a secure container. Notification can also be made concerning an attempted access of a secure container resulting in a denial of access, and such notification could include the identity of the token holder, the date and/or time of the attempted access, the geographical location of the secure container, and/or the identity of the particular package attempted to be delivered or picked up.

Indicator 334 can be any suitable mechanism for providing a human perceivable indication, such as a visual annunciator 338 that emits a light beam or an audible annunciator 336 that emits sound. Indicator 334 can be used to indicate that the secure container has been accessed, or that an attempt to access the secure container has occurred; according to one embodiment, different visual and/or audible signals are used to differentiate successful and failed deliveries.

As mentioned earlier, the electrical components of the secure container comprise an access element that can be implemented in a variety of ways, such as with a card/token reader 313 having a card/token slot 315. Card/token reader 313 can be any device having a portion such as card/token slot 315 to which a card or other token can be mated. When information stored on the token is identical to, or otherwise favorably compares with, information stored in or communicated to card/token reader 313, a positive match occurs, and this event is communicated over system bus 301 to local processor 304, which can then order electric lock 330 to open; otherwise, local processor 304 does not order electric lock 330 to open, and processor 304 may store an indication of an attempted access in local memory 306.

An electric keypad 316, optionally coupled to system bus 301 via bus 317, can be used in place of or in conjunction with card/token reader 313. Electric keypad 316 is electrically programmable, and it enables delivery personnel who do not have a card/token to access the secure container. A recipient could, for example, program electric keypad 316 for use by a friend to pick up an item from the secure container, or for use by a local small-business person to deliver an order into the secure container.

A biometric scanner 319, optionally coupled to system bus 301 via bus 314, can be used in place of or in conjunction with card/token reader 313 and electric keypad 316. Biometric scanner 319 can be of any known type that compares a scan of a biological attribute, such as a retina pattern, fingerprint, or voice pattern, of a delivery person with a stored sample of such attribute and generates a positive signal over system bus 301 to local processor 304 if a satisfactory match occurs.

As mentioned earlier in the description, many other types of access elements can be utilized with embodiments of the present invention. The foregoing card/token reader 313, keypad 316, and biometric scanner 319 are merely illustrative.

A power supply 318 supplies regulated voltage to the electrical components that are associated with the secure container. In one embodiment, power supply 318 is powered by line voltage via line 320. Optionally, a self-standing power supply subsystem can include at least one rechargeable battery 324 and a solar panel 326 to charge battery 324 as solar conditions permit. (As illustrated in FIG. 2, a solar panel 218 can be built into an appropriate panel of the secure container 202.)

Electric lock 330 is an electrically actuated lock that is triggered to open upon receiving one or more electric pulses or electrical signals, such as a combination of digital signals, over system bus 301 from local processor 304. Unless electric lock 330 is actuated, it remains locked, keeping the door 204 (FIG. 2) of secure container 202 closed to physical entry.

Climate control element 333 is optionally coupled via bus 337 to system bus 301, and it is employed to maintain a desired environment within the secure container. Climate control element 333 can include a heater element, a cooling element, or both, as well as a thermostat and any other climate control elements, such as a humidifier and/or dehumidifier, that may be necessary to maintain the environment within the secure container in a desired state.

Figure 4:
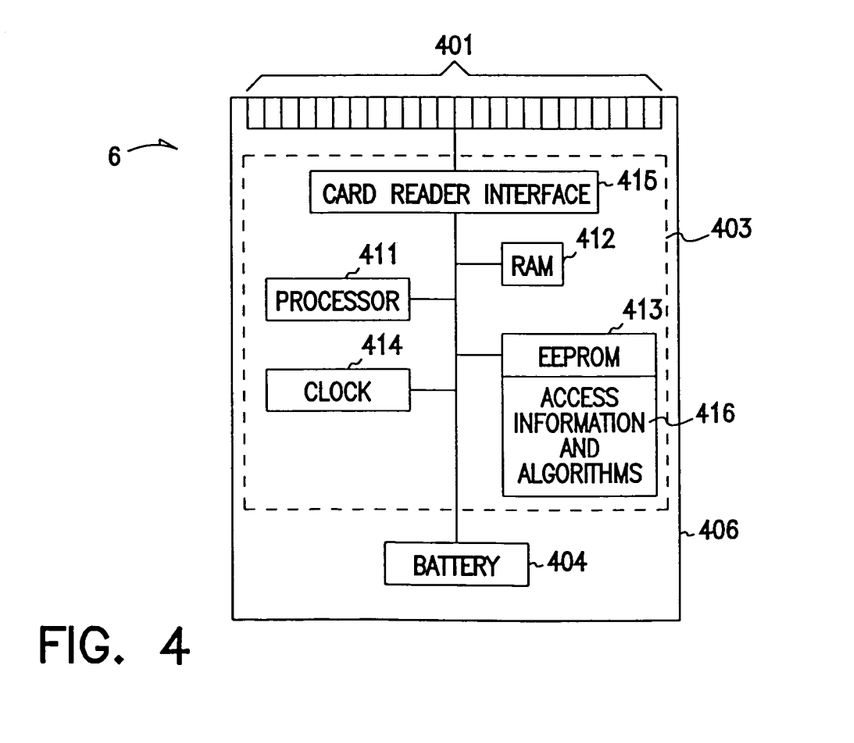
FIG. 4 is a block diagram of a token or access card for a secure pickup and delivery container, in accordance with one embodiment of the invention.

FIG. 4 is a block diagram of a token or access card 6 for a secure pickup and delivery container, in accordance with one embodiment of the invention. As indicated elsewhere in the description, token 6 can be a smart card, credit card, a magnetically encoded card, a personal digital assistant (PDA) or other handheld computing device, a bar-coded card or label, a device capable of communicating via radio frequency or light signals, or any other device that is readily transportable and that can store information. In the embodiment illustrated in FIG. 4, token 6 is a programmable smart card that includes a connector 401 for coupling to a card reader (such as card/token reader 313, FIG. 3); alternatively, token 6 can be coupled to a card reader through non-contact means such as inductive coupling, optical scanning, radio-frequency (RF) scanning, or the like.

Token 6 also comprises a card reader interface 415 that comprises suitable known circuitry for interfacing the internal electrical components of token 6 with an access element such as a card reader. Card reader interface 415 serves to pass information in at least one direction between token 6 and a card/token reader 313 (FIG. 3) and preferably bidirectionally.

Token 6 further comprises a processor 411, a clock 414, and at least one computer-readable medium in the form of an electronic memory or storage element, such as random access memory (RAM) 412 and electrically erasable programmable read only memory (EEPROM) 413. Processor 411 executes computer program instructions stored in RAM 412 and/or EEPROM 413, stores data into RAM 412 and/or EEPROM 413, and reads data from RAM 412 and/or EEPROM 413.

Processor 411 can be of any suitable type, including those mentioned earlier with respect to local processor 304. The particular type is not essential to the implementation of embodiments of the present invention.

EEPROM 413 can alternatively be any other type of non-volatile memory such as flash memory. EEPROM 413 includes a memory area 416 that stores algorithms in the form of computer-executable instructions, data structures, and/or other data types. These algorithms can be utilized by certain embodiments of the present invention to perform various methods of accessing a secure pickup and delivery container. Memory area 416 also stores access information that, when token 6 is mated with a token reader such as card/token reader 313 (FIG. 3), is used to determine whether the secure container will be opened or not to the holder of token 6. The access information stored in memory area 416 can include identity information, authorization information, access control information, and transaction information.

Identity information identifies a delivery person, a particular package, or a particular secure container, for example.

Authorization information identifies the scope of access privileges as they pertain to the token holder. For example, a token holder can be authorized to access secure containers only during his or her work shift and/or only in a specified geographical area.

Access control information identifies the scope of access permitted for one or more secure containers. For example, access to one or more secure containers may be limited to certain dates and/or times. Whereas earlier, in the description of FIG. 3, this information was described as being stored in the control units of secure containers, where it is used to make a determination whether to unlock the secure container or not, a less sophisticated and correspondingly less expensive control unit on the secure container could be employed if the access control information were stored on the token.

Transaction information identifies various attributes of an access transaction. Transaction information can be stored in a memory element, such as local memory 306 (FIG. 3). Transaction information can also be appropriately distributed, for example, to be stored on a token carried by a delivery person. Transaction information can be distributed to any other entity, such as a shipper, a delivery company, and/or to a recipient. For example, transaction information can be distributed to a recipient's PDA or personal computer, either via a wireline interface or a wireless interface.

Transaction information can include information regarding a package, such as information identifying the package, the shipper, the package contents, and any other package attributes.

Transaction information can include information regarding a container to which access was made or attempted, such as the identity of the container.

Transaction information can include information regarding a delivery person accessing or attempting to access the secure container, such as the identity of the delivery person.

Transaction information can include information regarding a token, such as the identity of the token, as well as other token attributes, such as the type of token, the identity of the token holder or issuer, and so forth.

Transaction information can include information regarding a location, such as a geographical location of a container to which access was attempted or successfully made.

Transaction information can include information regarding access of the container, such as information indicating whether an access was attempted, and whether the access was successful or unsuccessful.

Transaction information can include date information and/or time information, for example identifying a date and/or time when an access was attempted or completed.

Other types of transaction information can be generated, stored, and/or distributed, depending upon the needs of the particular pickup and delivery system that the subject matter is utilized in.

In one embodiment, token 6 comprises a battery 404 for powering the electrical components of token 6. In another embodiment, token 6 does not include a battery, and the electrical components are powered through appropriate conductor elements of connector 401.

Token 6 further comprises a housing 406 that houses the constituent elements of token 6. The shape of housing 406 is typically designed to mate with a corresponding portion of the access element, such as a card slot 315 (FIG. 3) in card/token reader 313. Thus, in one embodiment housing 406 is card-shaped. However, housing 406 could be of any desired shape.

Figure 5:
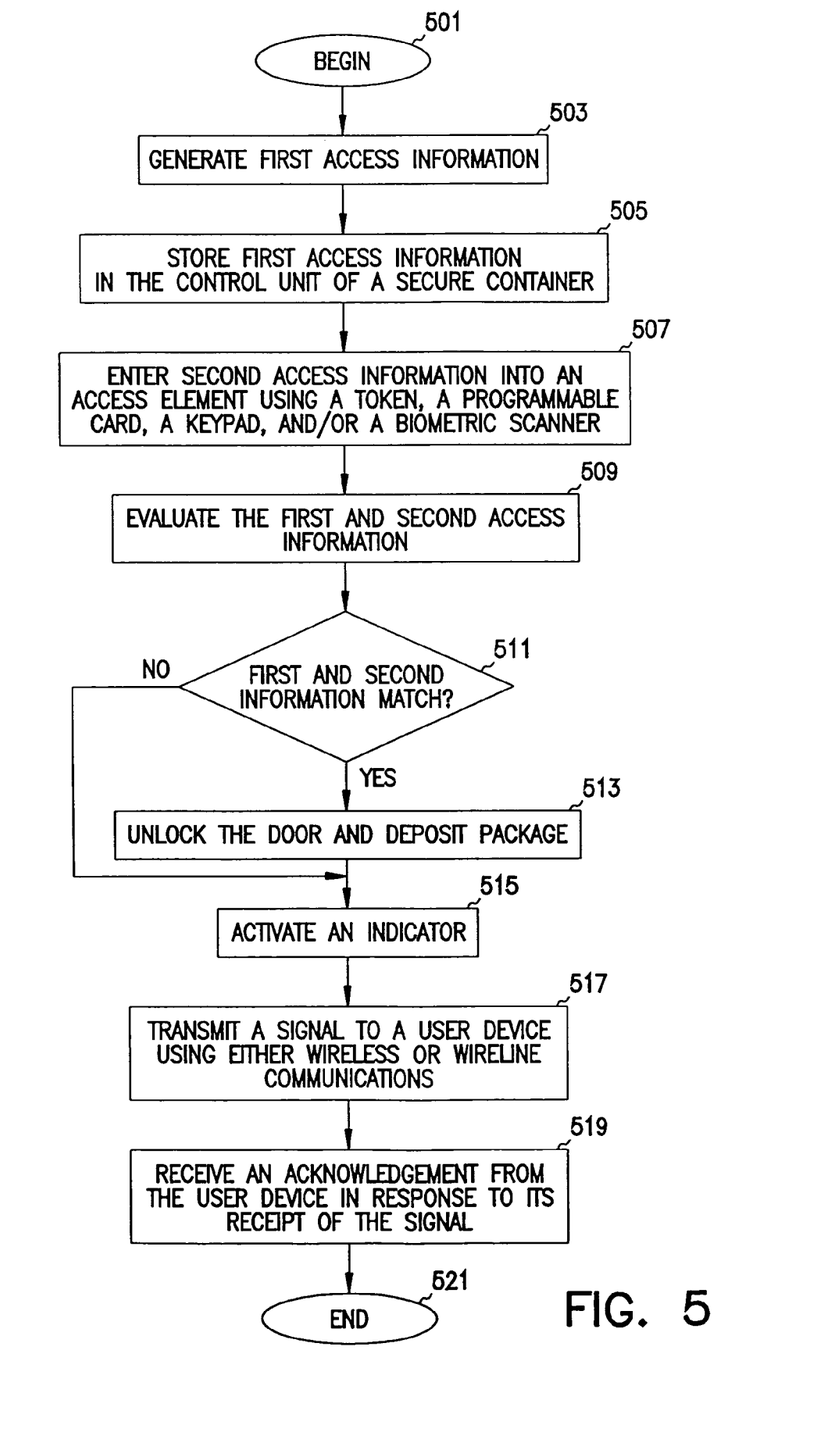
FIG. 5 is a flow diagram of a method for operating a secure pickup and delivery container, in accordance with one embodiment of the invention.

FIG. 5 is a flow diagram of a method for operating a secure pickup and delivery container, in accordance with one embodiment of the invention. The method can be performed by computer processors, such as those contained in user devices 331 and/or 332 (FIG. 3), or such as local processor 304 (FIG. 3) and token processor 411 (FIG. 4), which processors, whether singly or in combination, execute suitable instructions to carry out the various operations of the method. The method begins in 501.

In 503, first access information is generated, for example, by user devices 331 and/or 332 (FIG. 3). The first access information can be identity information (e.g. identity of delivery person, identity of container, identity of token, etc.), location information, date information, time information, access frequency information, package-specific information, and/or information specifying what to do if an access is attempted or completed, all substantially as discussed earlier.

In 505, the first access information is stored in the control unit of a secure container, for example in local memory 306 (FIG. 3).

In 507, second access information is entered into an access element using a token. As mentioned earlier, a "token" can include a programmable card, a keypad, and/or a biometric scanner, and any other device that is readily transportable and that can store information. The second access information is generally required to be identical or similar to the first access information, in order to permit access to the container interior by unlocking the door.

In 509, the first and second information are evaluated, for example by local processor 304 (FIG. 3) executing suitable computer program instructions.

In 511, a determination is made whether the first and second information match. If so, the method proceeds to 513; if not, it goes to 515. "Match" is defined herein to mean that the first and second information are substantially identical within some acceptable degree of tolerance.

In 513, the door on the secure container is unlocked, so that a package can be deposited within the secure container.

In 515, an indicator is activated to notify either that an access has been made to the secure container or that an access attempt has been made. The visual or audible annunciator of the indicator could emit different lights or sounds to differentiate a valid access from a failed access attempt.

In 517, a signal is transmitted to a user device, for example user device 331 and/or user device 332, using wireline or wireless communications, respectively. As described earlier, the signal can provide notification regarding the details of the access or access attempt. The signal can be stored in the user device at a remote location for later analysis or reporting.

In 519, an acknowledgment is received from a user device in response to its receipt of the transmitted notification signal. In one embodiment, the acknowledgment is recorded in the token 6 of the delivery person 7, thus serving as an electronic "signature" for the pickup or delivery of the package.

The method ends in 521.

It will be noted from the above description that user devices 331 and/or 332 (refer, for example, to FIG. 3) may communicate first access information (also referred to herein as "access privilege information") as well as receive transaction information. The term "integral hand-held recipient user device" refers herein to an embodiment in which a hand-held "user device" (as previously defined) may be used by a "recipient" (as previously defined) both to generate first access information and to receive transaction information.

The operations described in the flow diagrams can be performed in a different order from that shown. It should also be understood that, while the methods depicted in the flow diagrams are depicted as having an "end", they can be performed continuously.

CONCLUSION

The subject matter provides a secure pickup and delivery container that enables delivery personnel to pick up packages from, and to deliver packages to, residences and other buildings notwithstanding the absence of anyone to safeguard the packages from theft or adverse environmental conditions. The architecture of the computing and electrical structures that are used to implement embodiments of the invention provides a great deal of flexibility and scalability, so that embodiments of the present invention can be implemented in a variety of commercially competitive products.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the subject matter. For example, the subject matter could be used by a package delivery enterprise to maintain statistical records of deliveries, including productivity statistics, such as the number of deliveries per delivery person per unit time or per unit distance. Therefore, it is manifestly intended that embodiments of this invention be limited only by the claims and the equivalents thereof.

What is claimed is:

1. A secure pickup and delivery container comprising:
   a door to allow access to an interior part of the container and comprising a lock;
   an access element to receive a request to access the interior part of the container; and
   a control unit comprising a storage element to store access privilege information, the control unit further comprising a processing element, coupled to the access element and to the lock, to unlock the lock if the request is authorized, and otherwise to keep the container locked;
   wherein the access privilege information comprises information regarding a first token and information regarding a specified frequency of delivery within a given time period;
   wherein the processing element is to compare the request with the access privilege information to determine whether the request to access the container is authorized;

wherein the control unit further comprises an interface over which an integral hand-held recipient user device can communicate access privilege information to the control unit and receive transaction information from the control unit, the interface being selected from the group consisting of a wireline connection to which the recipient user device can be coupled and a wireless transceiver with which the recipient user device can communicate wirelessly; and wherein the transaction information comprises information regarding the identity of a token, including the first token, used to attempt access to the container.

2. The container recited in claim 1 wherein the access privilege information comprises information selected from the group consisting of information regarding a package, information regarding the container, information regarding a delivery person, information regarding a location, information regarding a successful access of the container, information regarding an attempted access of the container, date information, and time information.

3. The container recited in claim 1 wherein transaction information comprises information selected from the group consisting of information regarding a package, information regarding the container, information regarding a delivery person, information regarding a geographical location, information regarding a successful access of the container, information regarding an attempted access of the container, date information, and time information.

4. The container recited in claim 1 wherein the container comprises an indicator selected from the group consisting of a visual annunciator and an audible annunciator.

5. The container recited in claim 1 wherein the access element comprises a token reader to mate with a token, including the first token, tendered by a delivery person.

6. The container recited in claim 1 and further comprising a power supply coupled to the control unit, the power supply comprising a solar panel and a rechargeable battery.

7. The container recited in claim 1 and further comprising a climate control element to maintain a desired environment within the container, and wherein access privilege information comprises information to turn on the climate control element.

8. The container recited in claim 1 and further comprising an anchoring element to render the container substantially immobile.

9. The container recited in claim 1 wherein additional information is receivable over the interface from the recipient user device.

10. The container recited in claim 9 wherein the additional information comprises acknowledgment of receipt of a notification that a delivery has been made to the container.

11. The container recited in claim 1 wherein information regarding frequency of delivery comprises a specified quantity of accesses of the container by a delivery person.

12. The container recited in claim 1 wherein access privilege information comprises information limiting delivery to a specified range of dates and/or a specified range of times.

13. The container recited in claim 1 wherein access privilege information comprises information limiting delivery to a container in a specified geographical region.

14. The container recited in claim 1 wherein access privilege information comprises information regarding what notification is to be made regarding an attempted access of the container, or regarding a successful access of the container.

15. The container recited in claim 1 wherein access privilege information comprises information identifying one or more delivery persons authorized to make a delivery to the container.

16. The container recited in claim 1 wherein access privilege information comprises information regarding the identity of the first token.

17. The container recited in claim 1 wherein transaction information comprises notification that a delivery has been made to the container.

18. The container recited in claim 1 wherein transaction information comprises identity of a package delivered to the container.

19. A secure pickup and delivery container comprising:
a door to allow access to an interior part of the container and comprising a lock;
an access element to communicate with a token, the token comprising a first storage element to contain first identity information; and
a control unit comprising a second storage element to store second identity information, the control unit further comprising a processing element, coupled to the second storage element, to the access element, and to the lock, to unlock the lock if the first and second identity information match, and otherwise to keep the container locked;
wherein the second identity information comprises information regarding the token and information regarding frequency of delivery;
wherein the control unit further comprises a first interface over which an integral hand-held recipient user device can communicate the second identity information to the control unit, the first interface being selected from the group consisting of a wireline connection to which the recipient user device can be coupled and a wireless transceiver with which the recipient user device can communicate wirelessly;
wherein the access element further comprises a second interface to receive the first identity information from the token and to pass transaction information regarding a completed or attempted access of the container to the first storage element of the token;
wherein the transaction information is transmitted from the control unit to the recipient user device over the first interface.

20. The container recited in claim 19 wherein the first identity information comprises information selected from the group consisting of information regarding a package, information regarding the container, information regarding a delivery person, information regarding a location, information regarding a successful access of the container, information regarding an attempted access of the container, date information, and time information.

21. The container recited in claim 19 wherein transaction information comprises information selected from the group consisting of information regarding a package, information regarding the container, information regarding a delivery person, date information, and time information.

22. The container recited in claim 19 wherein the access element comprises a token reader to mate with the token.

23. The container recited in claim 19 and further comprising an anchoring element to render the container substantially immobile.

24. The container recited in claim 19, wherein the control unit is also to receive an acknowledgment of receipt of the transaction information from the recipient user device.

* * * * *